United States Patent [19]

Gallegos et al.

[11] Patent Number: 5,245,778
[45] Date of Patent: Sep. 21, 1993

[54] FISHING POLE HOLDER AND HOOK DEVICE

[76] Inventors: Robert W. Gallegos, 5342 Primrose La.; Dan J. Gallegos, 8333 Navajo St., both of Denver, Colo. 80221

[21] Appl. No.: 5,826

[22] Filed: Jan. 19, 1993

[51] Int. Cl.⁵ ............................................. A01K 97/12
[52] U.S. Cl. ........................................ 43/15; 43/21.2; 43/16
[58] Field of Search ................ 43/17, 15, 16, 21.2; 248/538, 539, 530, 534; 224/922

[56] References Cited

U.S. PATENT DOCUMENTS

| | | | |
|---|---|---|---|
| 1,831,190 | 11/1931 | Parker | 248/534 |
| 2,744,351 | 5/1956 | Smith | 43/16 |
| 2,781,600 | 2/1957 | McDonnell | 43/15 |
| 2,804,277 | 8/1957 | Kinder | 43/15 |
| 2,811,801 | 11/1957 | Daniel | 43/15 |
| 2,918,746 | 12/1959 | Hamrick | 43/15 |
| 2,964,868 | 12/1960 | Bennett | 43/21.2 |

Primary Examiner—Richard K. Seidel
Assistant Examiner—James Miner
Attorney, Agent, or Firm—Charles C. Corbin

[57] ABSTRACT

Disclosed is a fishing rod holder including a spring-loaded fishing rod mount that is pivotally attached to the top of a release mechanism housing, and a ground stake that extends downwardly from the housing. The release mechanism includes a trip rod that is slidably mounted in the housing and that is urged by spring force to move longitudinally from a cocked position in which a tip of the trip rod projects through an opening in the front wall of the housing, to a retraced position in which the trip rod tip is retracted within the opening. A lever arm extends laterally from the trip rod through a slot in a side wall of the housing and can be engaged in a vertical part of the slot to hold the trip rod in its cocked position. A flexible latch member extends from the rod mount and has a slip ring on its lower end for engaging the extended tip of the trip rod to retain the fishing rod mount, against spring force, in a generally horizontal position. The fishing line is diverted from the reel around the outer tip of the lever arm and back through the fishing rod, and tension in the line generated by a striking fish will cause the lever arm to be rotated beyond the grasp of the vertical slot which releases the trip rod from its cocked position, which in turn releases the slip ring which allows the mount to be forcefully swung to a raised position.

11 Claims, 1 Drawing Sheet

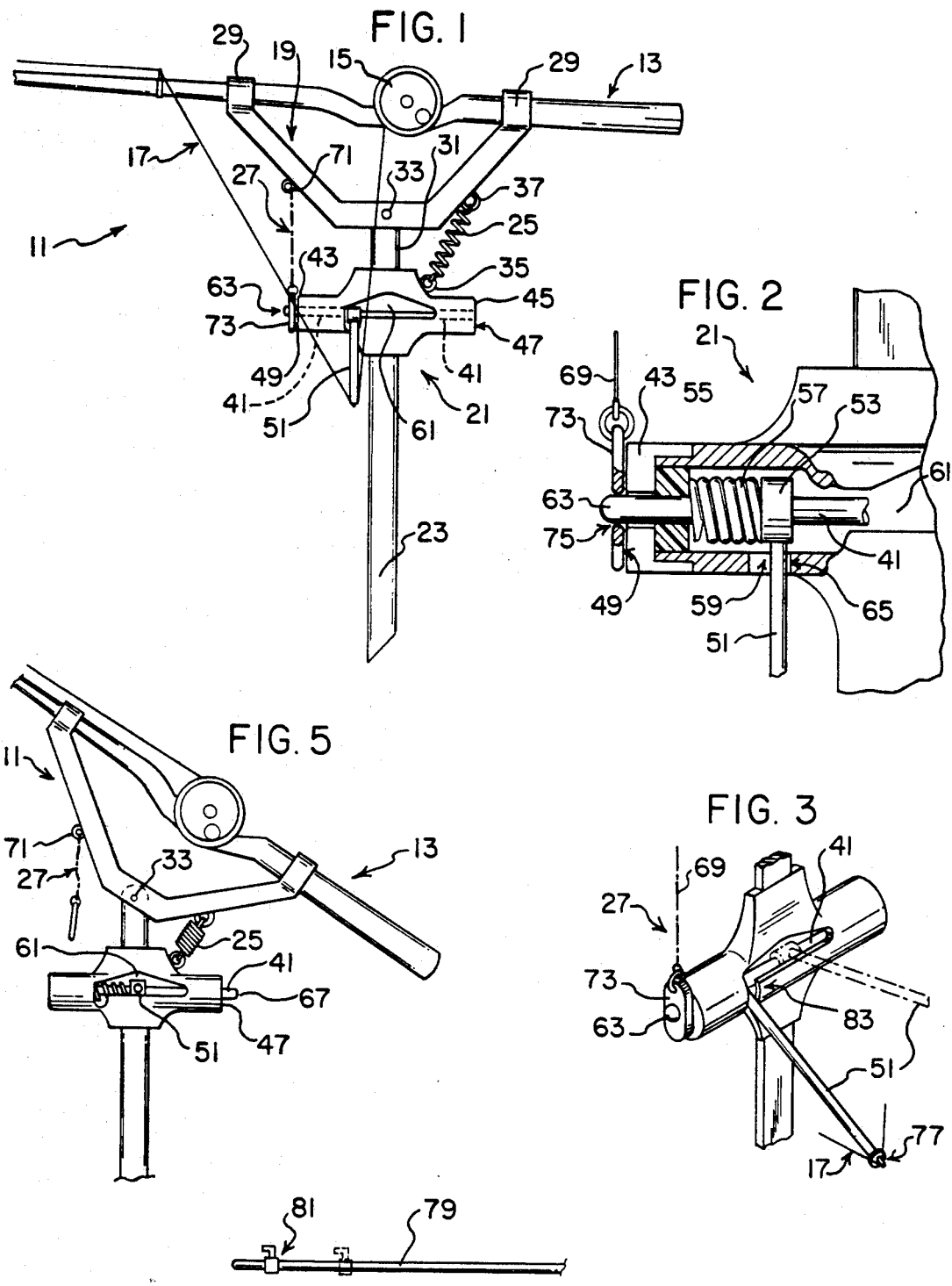

5,245,778

FISHING POLE HOLDER AND HOOK DEVICE

BACKGROUND OF THE INVENTION

1. Field of the Invention

The present invention relates generally to fish hooking devices that include a spring loaded rod holder for holding a fishing rod in a cocked position from which it can be tripped to swing to a more upright position on the occasion of a fish strike. More particularly, the present invention relates to such a device that has an improved release mechanism.

2. Description of the Prior Art

The prior art is replete with examples of spring-loaded devices for holding a fishing rod and for automatically swingwing the rod upwardly when a fish strikes the bait. Various configurations of such devices can be seen in U.S. Pat. Nos. 5,076,001, 5,050,332, 2,811,801, 2,804,277, and 2,781,600. Unfortunately, while these prior efforts may demonstrate particular utility in achieving intended goals, they appear not to be without various limitations and drawbacks, and there remains a need for improvements.

SUMMARY OF THE INVENTION

In view of the foregoing it is a general object of the present invention to provide an improved fishing pole holder and automatic hooking device.

Another general object of the invention is to provide such a device having an improved release mechanism.

A further object is to provide such a fishing device with a release mechanism having a sensitivity that can be adjusted to respond to a predetermined amount of pulling force on the fishing line.

A still further object is to provide a release mechanism that can be set to be highly responsive to small release pressures.

Yet a further object is to provide such a devise that is easily adapted for left-handed, as well as, right-handed reels.

These and other objects and advantages are provided by the present invention of a fishing pole holder and hooking device that includes a bracket for releasable supporting the fishing pole, a main housing on top of which the support bracket is mounted to swing about a horizontal axis under spring-force, to move the pole from a relatively level position to a substantially raised position. Support means for a securing the device stationarily with respect to the ground extends from the bottom of the housing. The invention features release mechanism mounted within the housing, which housing includes a front wall having a bore therethrough, and opposing sidewalls of which at least one is provided with a slot that has a longitudinal portion and a vertical portion. A trip rod, having a longitudinal axis, is slidably mounted within the housing for longitudinal movement from a forward position in which a tip portion of the trip rod projects through the front wall bore, to a rearward position into which it is urged by spring force, and in which the tip portion is fully retracted within the front wall bore. There is a lever arm that extends laterally from the trip rod and through the slot and it is pivotable about the axis of the trip rod, and is engagable with an edge of the vertical slot to hold the trip rod in its forward position against spring force. The lever arm is rotatable upwardly out of engagement with the vertical slot portion and into the longitudinal slot portion to allow the trip rod to be forcefully moved to its rearward position. There is line-engaging means provided on the outer end of the lever arm for releasably grasping the fishing line. A flexible latch extends downwardly from a forward part of the pole support bracket and has a lower end for slidably engaging the extended tip portion of the trip rod so as to retain the pole bracket in its cocked or level position. In one varient of the invention the line-engaging means is adapted to be selectively positioned along the lever arm. With the device set in its cocked position, the fishing line can be diverted from its normal path to go from the reel around the hook means and then back to the fishing rod. Then a sufficiently forceful tug on the line caused by a fish taking the bait will cause the lever arm to be rotated upwardly out of the grasp of the vertical slot portion, which in turn retracts the trip rod which releases the latch causing the fishing rod to be swung forcable upwardly.

BRIEF DESCRIPTION OF THE DRAWINGS

FIG. 1 is a side elevational view of a preferred embodiment of a fishing rod holder and automatic hooking device, according to the present invention, shown in its cocked position;

FIG. 2 is an enlarged, partially sectional side elevational view of the release mechanism of the device of FIG. 1;

FIG. 3 is a perspective view of a part of the device of FIG. 1;

FIG. 4 is a partial, enlarged side elevational view showing the lever arm of a varient of the present invention; and FIG. 5 is a side elevational view of the device of FIG. 1 in its released position.

DETAILED DESCRIPTION OF THE INVENTION

Referring now to the drawings, FIG. 1 shows one preferred embodiment of the invention in the form of device 11 that is designed to releasably hold a conventional fishing rod 13 that includes a reel 15 from which extends a fishing line 17, and which device 11, in a manner to be described hereinafter, will cause the pole 13 to be forcefully swung upwardly when a fish strikes the line with a sufficient predetermined amount of tug. The main components of device 11 comprise a pole bracket 19, housing 21 for a release mechanism, a ground stake 23, spring 25, and a keeper 27.

The pole mount 19, housing 21 and ground stake 23 are preferably constructed of a suitably strong and durable plastic material using conventional techniques of the plastic molding industry, although these components can also have a suitable metallic construction. The pole mount 19 includes two spaced-apart yokes 29 which are designed in a conventional manner to releasably clamp the pole 13 in the position shown in FIG. 1. In the example shown each yoke 29 features a pair of resilient arms that are shaped to be resiliently spread apart and grasp pole 13 with sufficient holding force when the pole is pushed within their grasp. It is to be understood that under the invention there are other suitable mechanisms that can be used with the mount 19 to releasably hold the pole 13.

Note that the lower end of mount 19 is pivotally attached to the tab 31 on the top of housing 21, by way of a pin 33, allowing it to turn about the axis of pin 33. The spring 25 is a conventional coil spring with its opposite ends secured in the anchor rings 35 and 37 respectively. Spring 25 is designed to turn the mount 19 and attached rod 13 forcefully in a clockwise rotation when the mount 19 is released from the position shown in FIG. 1, in a manner to be described.

The ground stake 23 is rigidly secured to the bottom of housing 21 and has a pointed lower tip to facilitate installation in the ground.

Housing 21 mounts the device's release mechanism which features an elongated metallic trip rod 41, that has opposite end portions slidably supported in opposite ends 43 and 45 of the housing 21 so that it can be slid longitudinally with respect to housing 21. There is a bore in each of the end walls 47 and 49 of housing 21, through which the ends of rod 41 can project.

The release mechanism further includes a lever arm 51 that has one end that is threadly secured to the slip-rod 41 at about 90° to the rod 41. FIG. 2 shows how the lever arm 51 is engaged through a tubular sleeve 53 so as to hold the sleeve 53 stationarily with respect to rod 41 which is journaled through a Teflon bushing 55. A coil spring 57 extends between the bushing 55 and sleeve 53 as shown in FIG. 5. FIG. 1 shows that the side wall of housing 21 is provided with a slot through which the lever arm 51 can pass, the slot having a vertical portion at 59 and a longitudinal portion 61. The lever 51 can be moved out of the longitudinal portion 61 and engaged in the vertical portion 59 when the rod 41 is moved sufficiently to the left as viewed in FIG. 1. This is the cocked position of the locking mechanism in which, FIG. 2 best shows, the coil spring 57 is compressed and a tip portion 63 of the trip rod projects beyond the housing wall 49. The lever 51 engages edge 65 of the vertical slot to prevent the trip rod moving to the right.

It will be seen that the locking mechanism has a released position shown in FIG. 5 in which the arm 51 lies in the slot portion 61 and end 67 of the trip rod projects beyond the housing end wall 47. In moving the device to its cocked position the portion 67 is available for being pushed in to facilitate the necessary movement to the cocked position. When the locking mechanism is secured in the cocked position shown in FIG. 1 and FIG. 5, the pole mount 19 can be set in its cocked position by rotating it against the urging of spring 2 to the position shown in FIG. 1 and securing the lower end of keeper 27 around the rod tip 63.

The keeper 27 comprises a chain 69 having its upper end secured in eye 71 on bracket 19, and its lower end connected to a rigid member 73, preferably made of a low-friction material such as Teflon polymeric material, and having an opening 75 that freely receives the tip portion 63 of the trip rod. Other flexible connectors that are equivalent to chain 69 can be used, and, although a light-weight flexible member is preferred, a rigid member that is pivotally connected to the bracket 19 and equipped with a suitable opening in its lower end, can also be used.

Note that, in order to accommodate both left-handed and right-handed fishing reels, each opposing side wall of the housing 21 is provided with a slot which mirrors the one shown in the drawings. In order to accommodate a different-handed reel, the lever arm 51 can be unscrewed from the trip rod 41 and then inserted through the other side wall slot (not shown) and reattached to trip rod 41.

FIGS. 1 and 3 show that the outer end of lever arm 51 has a circular element 77 that is secured a short distance from the tip of arm 51. This construction is designed to retain the fishing line 17 in engagement with the outer end of arm 51 when the line 17 is diverted from the reel 15 as illustrated in FIGS. 1 and 3, and engaged under the outer tip of arm 51. FIG. 4 illustrates a variant of the invention in which a lever arm 79 has attached to it a line-retaining member 81 that can be secured at any location along the length of arm 79. The member 81 can be secured at a selected location by several suitable conventional means, not shown, such as a screw-clamp mechanism. It will be appreciated that by adjusting the position of member 81, the mechanical advantage and the leveraging force derived from the pull of the fishing line 17 can be adjusted. An additional way of adjusting the sensitivity of the device's release mechanism is to select the distance that arm 51 is spaced from the edge 83, best shown in FIG. 3, of the vertical slot portion 59.

In using the device 11 for fishing, the line is cast and rod 13 is mounted, and the device is set in the configuration shown in FIG. 1. When a fish strikes the line with sufficient force, the lever arm 51 will be urged upwardly beyond the slot edge 83, which releases the trip rod 41, in turn disengaging the keeper 27 to allow the bracket 19 and fishing rod to be swung forcefully to the raised position shown in FIG. 5.

While a particular embodiment of the invention has been described herein, it is not intended that the invention be limited thereto, since various modifications and changes may readily occur to those skilled in the art without departing from the invention. Therefore, it is aimed to cover all such changes and modifications that fall within the true spirit of the invention as defined in the claims which follow.

What is claimed is:

1. Fishing pole holder and hooking device for a fishing pole equipped with a reel and a fishing line extending forwardly from said reel, said device comprising:
   a. main housing having an upper portion, opposing side walls, a rear wall and a front end wall having a bore therethrough, and a slot in at least one of said side walls having a longitudinally extending portion and a vertical portion;
   b. means, extending downwardly from said housing, for engaging the ground and holding said housing stationary with respect to the ground;
   c. bracket for releasably supporting said fishing pole, said bracket pivotally mounted to said housing upper portion for rotation about a generally horizontal axis, from a first position in which said fishing rod is held generally horizontal, to a second position in which said fishing rod is significantly inclined to the horizontal;
   d. spring means interconnecting said housing and support bracket, for urging said bracket towards its second position;
   e. release mechanism mounted within said housing and including a trip rod having a longitudinal axis and mounted for motion in a longitudinal direction with a tip portion slidably received in said bore, said trip rod having a forward position wherein said tip portion projects forwardly beyond said housing front wall, and having a rear position in which said tip portion is retracted within said bore; spring means for biasing said rod towards its rear position; lever arm, having a first end attached to said trip rod and extending laterally through said slot, said arm having an outer end that is adapted to be releasably engaged by said fishing line, and said arm pivotally secured to said trip rod for rotation about said longitudinal axis, said arm adapted to engage said vertical slot portion to hold said trip rod in its forward position, said arm being rotatable from said vertical portion to said longitudinal portion to allow said trip rod to move to its rear position;

f. latch member having an upper end attached to said bracket and a lower end adapted to slidably engage said trip rod tip portion so as to hold said bracket in its first position; and g. wherein rotation of said lever out of engagement with said vertical slot portion will release said trip rod to move to its rear position and dissengage said latch member to cause said bracket to be rotated to its second position.

2. Device as defined claim 1 wherein said trip rod is mounted for rotation about its longitudinal axis.

3. Device as defined in claim 1 wherein said support member is a round stake having a lower end adapted for insertion within the ground.

4. Device as defined in claim 1 wherein said latch member is generally flexible and its lower end is a rigid structure with an opening therein for receiving said tip portion.

5. Device as defined in claim 4 wherein said rigid structure is a ring.

6. Device as defined in claim 1 wherein said lever arm extends at about 90° to said longitudinal axis.

7. Device as defined in claim 1 wherein the outer end of said lever arm is adapted to release said line when said arm engages said longitudinal slot portion.

8. Device as defined in claim 1 wherein both of said housing side walls have said slot.

9. Device as defined in claim 1 wherein said arm first end is releasably secured to said trip rod.

10. Device as defined in claim 1 wherein said spring means for said bracket is adjustable.

11. Device as defined in claim 1 including means securable to said arm so as be adjusted in position along said arm, and adapted to be releasably engaged by said fishing line.

* * * * *